Aug. 16, 1938.  J. HELLE ET AL  2,127,360
PROCESS FOR THE REMOVAL OF ACID FROM NITRATED STARCH
Filed Nov. 10, 1936  4 Sheets-Sheet 1
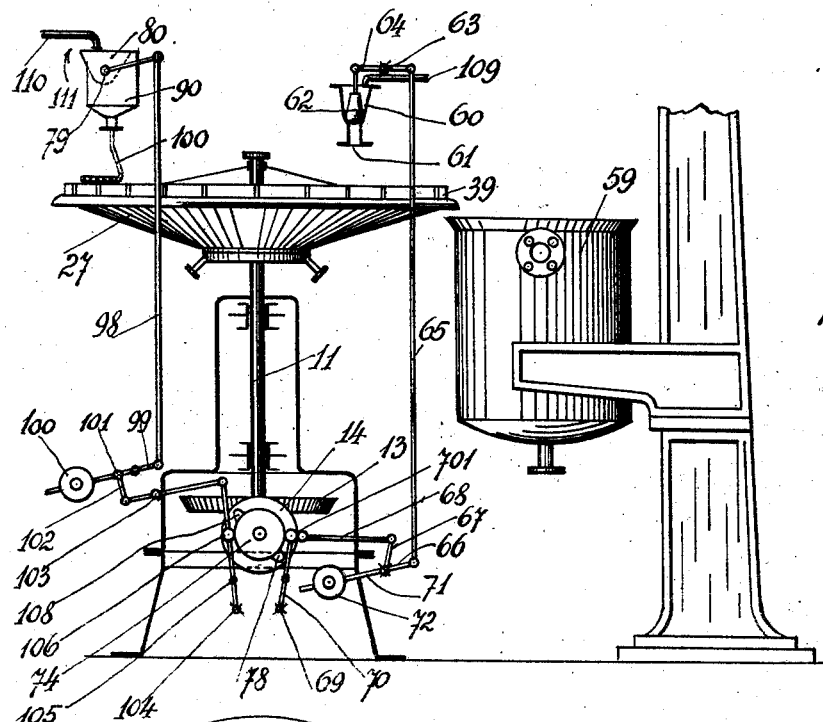
Fig.2
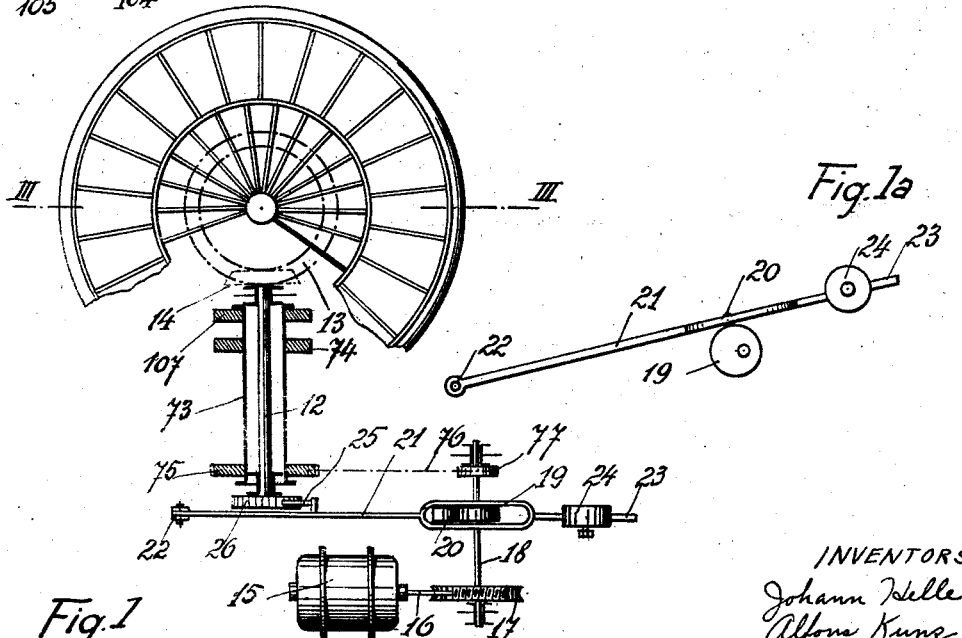
Fig.1a
Fig.1
INVENTORS
Johann Helle
Alfons Kung
BY Albert F. Nathan
ATTORNEY Aug. 16, 1938.  J. HELLE ET AL  2,127,360
PROCESS FOR THE REMOVAL OF ACID FROM NITRATED STARCH
Filed Nov. 10, 1936  4 Sheets-Sheet 2

INVENTORS
Johann Helle
Alfons Kung
BY Albert F. Nathan
ATTORNEY

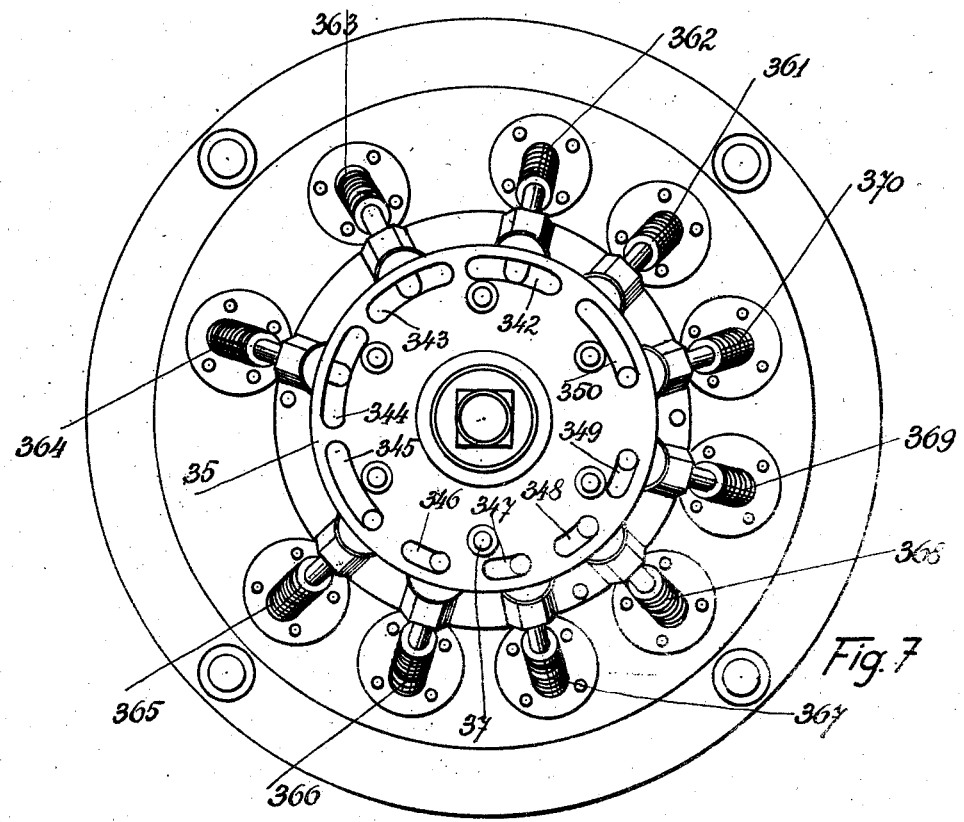
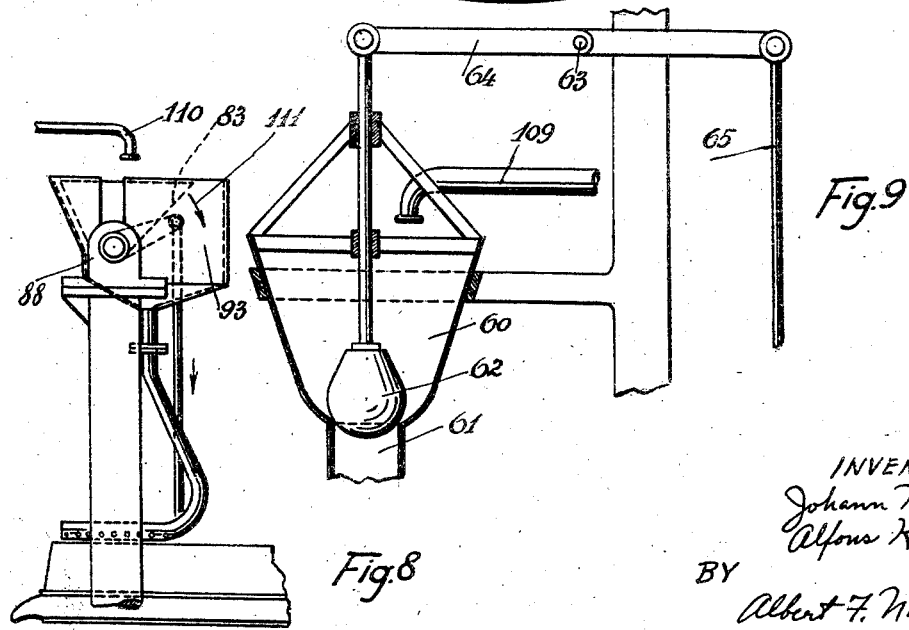

Patented Aug. 16, 1938

2,127,360

UNITED STATES PATENT OFFICE 2,127,360

PROCESS FOR THE REMOVAL OF ACID FROM NITRATED STARCH

Johann Helle and Alfons Kunz, Fuzfo, Hungary, assignors to Nitrokemia Ipartelepek Reszvenytarsasag, Budapest, Hungary Application November 10, 1936, Serial No. 110,187
In Hungary May 22, 1936

3 Claims. (Cl. 260—148)

This invention relates to a process for the removal of acid from nitrated starch.

The invention provides means for a continuous operation in a particularly economic manner, so that the acid removed from the mass can be used again in further operations.

It is known to remove the free mixed acid from nitrated starch by covering a layer of the nitrated starch of approximately uniform thickness with a mineral acid of the same specific gravity, and in the same amount as the mixed acid contained in the mass, and thereby displacing the mixed acid in the mass. The displaced mixed acid is freed from water and can be used again as concentrated acid. The mineral acid, for example sulphuric acid, contained in the mass after displacement of the mixed acid is then replaced by water, and thereupon the mass is washed. This procedure is difficult to carry out in a continuous operation, and uses up a considerable amount of acid.

The invention provides a process for overcoming the above mentioned difficulties, and the nitrated starch is arranged in separate batches in a series, and these batches are treated in countercurrent with water and freed from the mixed acid. The separate masses of nitrated starch identical one with the other are spread in layers of the same thickness on filter stones arranged separately one from the other in a common carrier, and washed out with water in such a manner that the pure water is conducted to the mass already repeatedly extracted and containing the least amount of mixed acid and the acidified water obtained at this point is successively conducted to nitro starch masses containing more and more mixed acid. The aqueous acid drawn from the last mass of the series is removed and can be used as concentrated acid, for example, in nitrating fresh starch. If the nitro starch from which the acid has been extracted is removed for further operations and replaced by a corresponding amount of crude nitrated starch, the removal of acid can proceed without interruption of the operation but before replacing the washed out nitro starch with a fresh batch of acid-containing nitro starch the filter stone on which the latter is to be placed must first be freed from water, for example, in the manner as hereinafter to be described.

The apparatus in accordance with this invention is constructed for continuous operation. The invention will now be further explained by reference to the accompanying drawings in which:—

Fig. 1 is a plan showing particularly the driving means.

Fig. 1a is a plan view of a portion of Fig. 1.

Fig. 2 is a detail of Fig. 1.

Fig. 7 shows a section on the line VII—VII of Fig. 3.

Fig. 8 shows the acid delivery to the separate cells.

Fig. 9 shows the arrangement for conducting the nitrated starch to the attachment.

Corresponding parts in the drawings are indicated by similar reference numerals.

Figure 4:
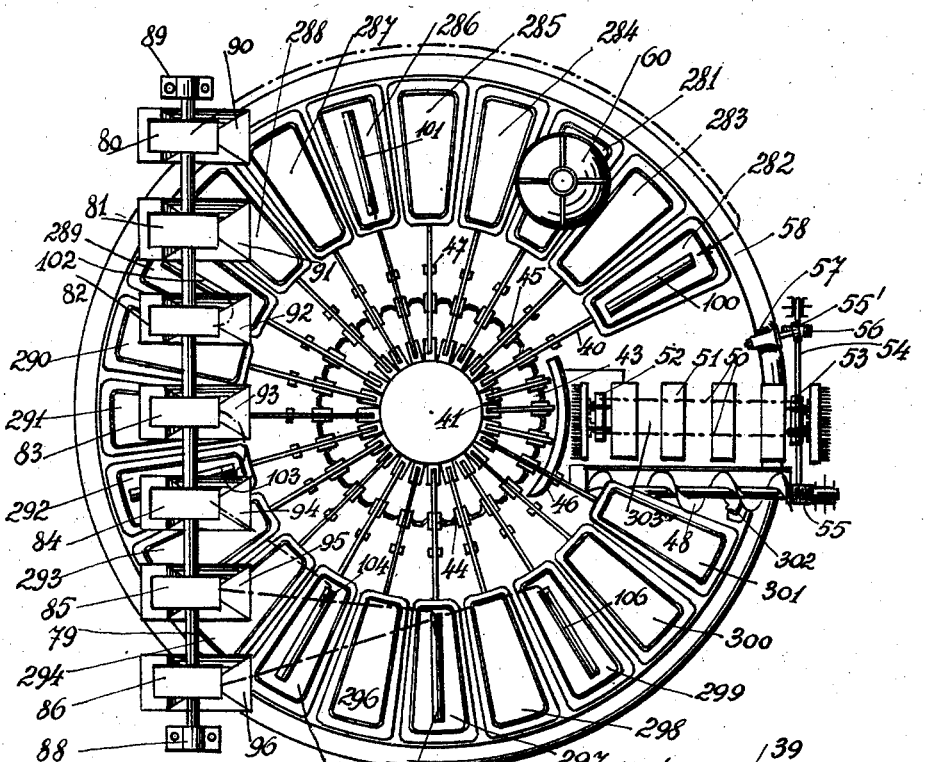
Fig. 4 is a plan of the attachment.

The perpendicularly disposed shaft 11 is driven by the shaft 12 by means of the bevel gearing 13 and 14. The shaft 12 rotates intermittently and is operated in this manner by the electric motor 15 through the co-operating drive shown in Fig. 1. The motor 15 drives the shaft 18 by means of the spindle 16 and worm gear 17. An eccentric 19 is keyed on to the shaft 18 and supports the rod 21 by means of the roller 20. The rod 21 is rotatably mounted on the pivot 22 and is loaded with the weight 24 at its free end.

The rod 21 carries a co-operating pawl 25 which engages in the teeth of the cog 26 and turns the shaft 12 through an angular distance equal to the pitch of the said teeth with each rotation of the eccentric.

At the upper end of the shaft 11 an attachment 27 is firmly keyed thereto so that this part 27 moves with the shaft 11. The attachment made, for example of acid resisting steel carries on its upper surface a series of segment shaped openings arranged in a circle one beside the other into which openings filter stones 281—303 are fitted to make a close fit. Under the filter stones 281—303 hollow spaces 29 are provided in the interior of the attachment each of which hollow spaces open into a channel 30 also in the interior of the attachment. The lower openings 31 of all these channels lie on a horizontally arranged annular sliding surface 32 of the attachment on which the attachment slides on an edge 33 also forming a sliding surface of a circular shaped member 35. Slots 342—350 are cut along the entire sliding surface 35 which slots are of different lengths for a purpose which will be hereinafter made clear. Each of these slots 341—350 open into flexible tubes 361—370 through which the contents of the channel 30 and the hollow spaces 29 may be conducted away. The circular member 35 is firmly pressed against the sliding surface 32 of the attachment by means of a number of springs 37 so that the wearing of the sliding surfaces can cause no leakage between the contacting surfaces. The lower ends of the springs 37 abut on the fixed housing 38 of the shaft 11.

A frame 39 having four pyramidal sides lies on each of the filter stones 281—303. This pyramidal form serves the purpose of preventing the filter cake being carried up with the frame when the latter is raised.

Each frame 39 is attached to an arm 40, all the arms 40 turning on a ring of pivots 41. A ring 42 is fixed on the attachment between the frames 39 and the pivots 41, and the upper edge 43 of the ring is slanted outwardly and provided with a swallow tail groove 44 for each of the arms 40.

These grooves form guides for the arms 40 in order to prevent side displacement by bending at the pivots 41, when the arms 40 are raised above or lowered to the filter stone.

The rollers 45 are arranged on the arms 40 to guide the latter on to the edge of the grooves 44.

Figure 3:
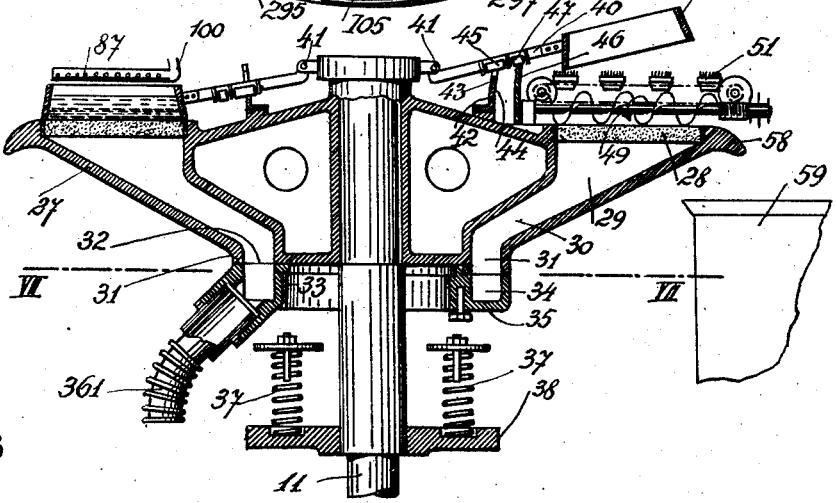
Fig. 3 is a longitudinal section on the line III—III of Fig. 1.
Figure 5:
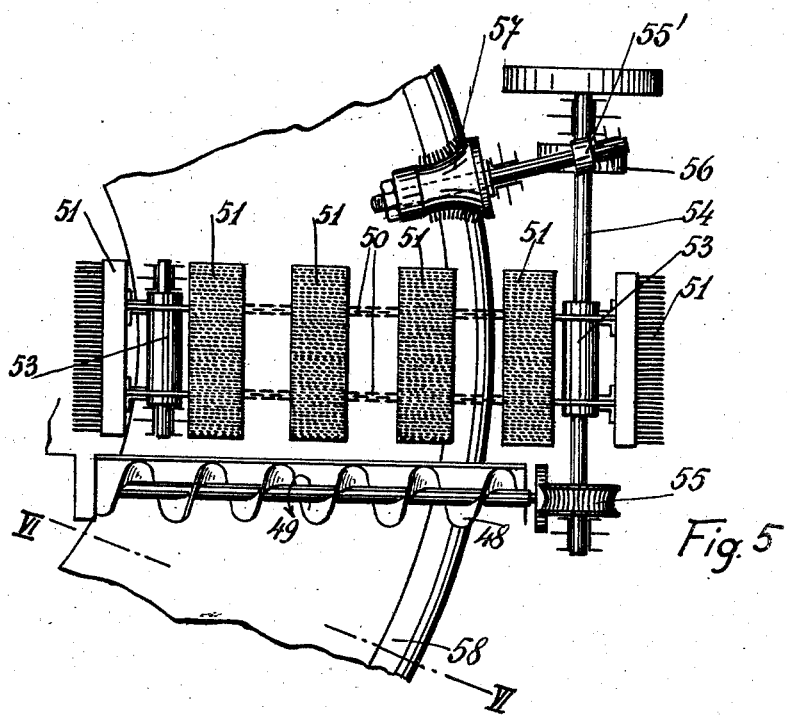
Fig. 5 shows on an enlarged scale the purification arrangement of the attachment.
Figure 6:
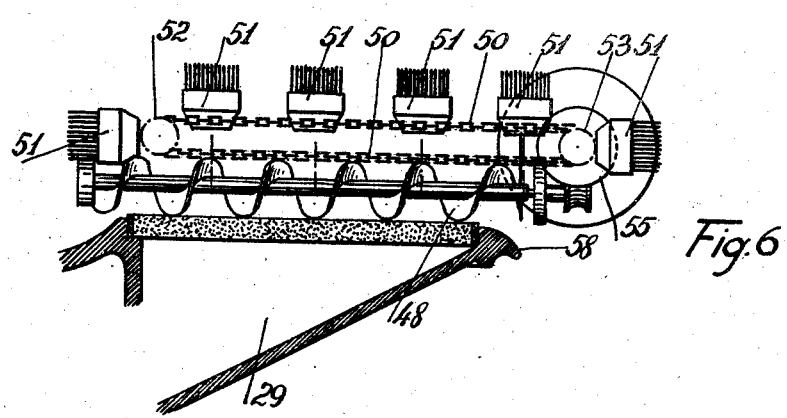
Fig. 6 shows a section on the line VI—VI of Fig. 5.

An arcuate rib 46 is arranged as a fixed rail on a part of the circular path and the height of this rib, which does not rotate with the attachment, increases progressively from one end until the height shown in Fig. 3 is reached for the purpose of raising the arm 40 at a determined position of its path from the filter stone to which it belongs, and then lowering it again to the same filter stone.

Rollers 47 are provided on the arm 40 to guide it along the rail 46.

At that part of the circular path at which the frames 39 are fully raised there are provided three cleaning devices namely the screw conveyor 48 which, rotating in the direction of the arrow 49, cleans the filter stone and removes the adherent material from the stone over the edge 58 of the attachment into a container 59. After the screw conveyor there follows a series of brushes 51 fixed on an endless chain 50. The chains move over rollers 52, 53, of which 52 revolves loosely and 53 is fixed on to the shaft 54. The shaft 54 drives the screw conveyor 48 through a worm gear 55 and also drives through helical screw gear 55', 56, the conical brush 57 which cleans the downwardly bent edge 58 of the attachment. All three cleaning devices move the material into the container 59.

The material to be treated is conducted from the container 60 to the separate cells formed by each filter stone and frame.

The container 60 is in the form of a funnel, and its lower wide opening 61 is closed by a ball valve 62. The valve 62 is connected with one end of the lever 64 movable about the pivot 63, and is operated by means of the draw rod 65.

For this purpose the draw rod 65 is connected with the arm 66 of a triple lever, the second arm 67 of which through the rod 68 is in hinged connection with the beam 70 movable about the pivot 69.

The lever 70 carries at its free end a roller 701. The weight 72 fixed on to the third arm 71 of the triple lever presses on the one hand by means of the rod 65 and the lever 64 the valve 62 into its seating, and on the other hand by means of the lever 67 and the rod 68 the roller 701 against the cam disc 74 arranged on the hollow shaft 73. The hollow shaft 73 coaxial with the shaft 12 is driven by the shaft 18 of the worm drive 17 and the chain 76 and chain wheels 75 and 77.

These transmissions are so selected that the hollow shaft 73 and the cam disc 74 arranged thereon together with abutment 78 makes one revolution whilst the pawl 25 turns the shafts 12 and 11 through a part of a rotation corresponding to the pitch of the teeth.

The number of teeth of the wheel 26 is the same as the number of filter stones of the attachment 27, so that with each rotation of the eccentric 19 the attachment 27 is rotated through an angular distance equivalent to the pitch of the stones and then remains stationary for a certain time. The abutment 78 is so arranged that it operates the rods 65 and 64 of the valve 62, that is to say, opens and closes the valve 62 during the time that the attachment 27 stands still.

The form of apparatus shown in the drawings is adapted for washing nitrated starch. The acids employed for this purpose of different concentration are conducted to the containers 80—86 arranged on the horizontal axle 79. The containers are of triangular longitudinal section (see Fig. 8) and the common axle 79 is passed through the lowest corner. Each container lies inside one of the fixed containers 90—96, and each of these containers opens at its lowest point into one of the pipes 100—106. Each of the tubes has a straight extended end provided with holes 97, and directed radially to the shaft 11, so that when the attachment stands still it is positioned in the middle of one of the frames 39.

The axle 79 is mounted in bearings 88 and 89 and is connected by lever 97 and rod 96 with a triple lever 99, loaded at its other end by the weight 100. The triple lever is movable about the fixed axle 101, and its third arm 102 is connected with the lever 105 movable about the axle 104 by means of the rod 103. The lever 105 is provided with a roller 106 which rolls on the periphery of the cam 107, and is operated by the abutment 108.

In washing nitrated starch the apparatus is operated as follows:—

A reduced pressure is set up in the conduits 361—370 each of which opens into a special collecting vessel, not shown in the drawings. The pulplike nitrated starch is conducted to the container 60 in amounts determined beforehand. The container 80 is filled with concentrated sulphuric acid, containers 81—83 with nitric-sulphuric acid solutions of progressively lower concentration and the containers 84, 85 and 86 with water. The filling of the containers is effected each time before the attachment is moved on through a subdivision, that is to say over one of the frames 39. Conveniently conduits 110 are provided for feeding the several containers in batches.

First of all the valve 62 is opened by the projection 78, by the operation of the rods 67, 68, 65 and 64, as the lower opening 61 of the container 60 is very wide, it empties itself suddenly and its contents are poured over the filter stone 281 standing under the container 60. The pulplike mass suddenly poured on the stone distributes itself on the stone in the frame standing above it in a layer of uniform thickness.

Simultaneously the projection 108 operates the rods 103, 102, 99, 98, 97 and turns the axle 79 in the direction of the arrow 111 so that the contents of all the containers 80—86 are poured respectively into the funnels 90—96, and through the tubes 100—106 to trickle between each two movements through their fine bore holes 87 on to the filtered nitrated starch cakes standing under the tube ends. The acid or water so conducted to the layers of nitro starch forms thereon layers of liquid of the same depth above each.

Concentrated sulphuric acid flows from the container 80 on to the empty stone 282, and is drawn therethrough by the vacuum under the stone. The object of this operation is to free the stone 282 from the water it contains. This acid is sucked off while the stone is in the position immediately following, that is to say where in the drawings (Fig. 4) the stone 283 is standing. The channels under the stones 282 and 283 open in the position shown in the drawings, through the slot 350 of the circular body 35 into the common flexible conduit 361. The acid here drawn off is regenerated.

The fresh mass of nitrated starch falling from the containers 60 comes to the stone 281. It contains still a considerable amount of acid, which is drawn off by the vacuum under the stone, partly in this position, and partly in the two positions immediately following this suction, filtration of the starch occurs simultaneously on stones 284 and 285. The channels 30 under the stones 281, 284, and 285 open in the position of the attachment shown in the drawings through slot 342 of the annular body 35 into the flexible conduit 362 corresponding to this slot. The concentrated acid here drawn off is regenerated and used for nitrating fresh starch.

The acid from the container 81 is poured on to the nitrated starch lying on stone 286. This acid has been drawn from the material on stones 289, 290 and 291. The suction filtering is effected in the three succeeding positions 286, 287 and 288 through the slot 343 and the tube 363. The acid drawn off here is regenerated and used for nitrating fresh starch.

The more dilute acid from container 82 which has been drawn from the material lying on stones 292, 293, and 294 is conducted to the material on stone 289. The channel 30 corresponding to stones 289, 290 and 291 opens through the common slot 344 into the flexible tube 364. The acid drawn off here goes to stone 286 through the container 81. The aqueous acid from container 83 which is drawn from the material on stones 296—298 is conducted to filter stone 292. Suction filtration goes on in the three succeeding positions 292, 293 and 294 and the liquid is conducted through the slot 345 of the annulus 35 common to these positions, and through the flexible tube 365 and the container 82 to the stone 289.

Pure water flows from the container 84 on to the material on stone 295. Suction filtration goes on in both succeeding positions 295 and 296, and the liquid drawn off goes through the slot 346 into the flexible tubing 366. It is then conducted to container 83 from where it goes to the stone 292.

In the same way pure water flows from the container 85 on to the material on filter stone 297. Suction filtration goes on in the two succeeding positions 297 and 298 through the slot 347 and tube 367 and the liquid drawn off is conducted to the container 83.

The material on stone 299 receives pure water from containers 86 which is drawn off in positions 299 and 300 through the slot 348 and the tube 368.

From the position 300 onwards the frames 39 are raised by the rib 46 so that the material can be removed by the conveyor devices 48 and 51. These conveyor devices remove the material freed from acid to the container 59 and simultaneously the edge of the attachment is cleaned by the brush 57. Water is drawn from the stone coming from the cleaning devices, through the slot 350 and the tubes 361 and 370.

The above description is given as if the apparatus were at rest, but as it is moving step by step this order of procedure is repeated at each movement forward of the attachment so that continually a stone is covered with fresh nitrated starch, and with the exception of those standing under the cleaning devices, acid of the described different concentrations or water is conducted to the remainder.

The water required for the process as described is about 0.7 kilo per kilo of nitro starch.

We claim:—

1. A process for the removal of nitrating acid from nitrated starch by displacement of the acid with water, which consists in drawing the water successively through a series of batches of the nitrated starch on filters wherein the liquid drawn through the last filter of the series is passed into the next preceding filter and so on, until the acid removed from the successively filtered batches of the series is drawn through a filter containing fresh nitrated starch, the water-washed nitrated starch being withdrawn from that end of the series where the fresh water enters while the filter thus cleared before being charged again with nitrated starch is freed from water.

2. A process for the removal of nitrating acid from nitrated starch by displacement of the acid with water, which consists in drawing the water successively through a series of batches of the nitrated starch on filters wherein the liquid drawn through the last filter of the series is passed into the next preceding filter and so on, until the acid removed from the successively filtered batches of the series is drawn through a filter containing fresh nitrated starch, the water washed nitrated starch being withdrawn from that end of the series where the fresh water enters while the filter thus cleared before being charged again with nitrated starch is freed from water by displacing the water in the filter with a constituent acid of the nitrating acid.

3. A process for the removal of nitrating acid from nitrated starch by displacment of the acid with water, which consists in drawing the water successively through a series of batches of the nitrated starch on filters wherein the liquid drawn through the last filter of the series is passed into the next preceding filter and so on, until the acid removed from the successively filtered batches of the series is drawn through a filter containing fresh nitrated starch, the water washed nitrated starch being withdrawn from that end of the series where the fresh water enters while the filter thus cleared before being charged again with nitrated starch is freed from water by displacing the water in the filter with sulphuric acid.

ALFONS KUNZ.
JOHANN HELLE.